Nov. 22, 1932.  G. RIGANTE  1,888,541
COIL STRUCTURE
Filed Nov. 5, 1931
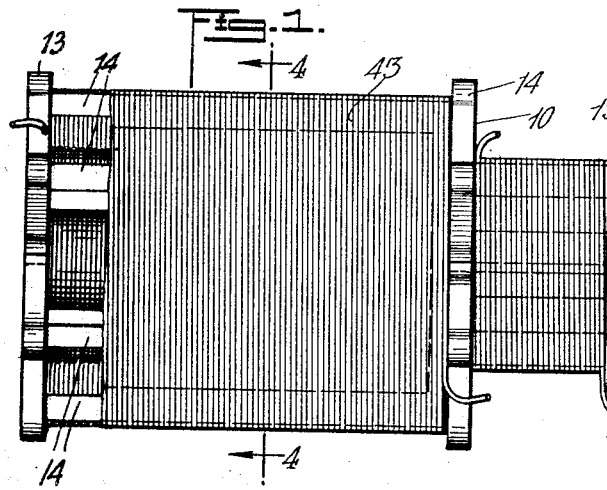
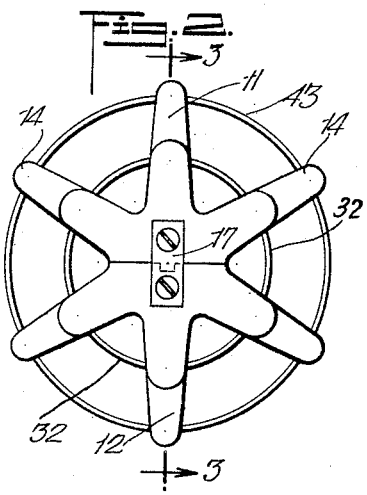
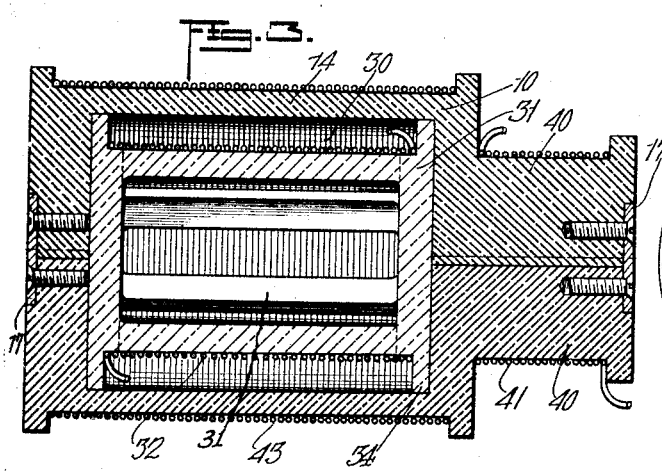
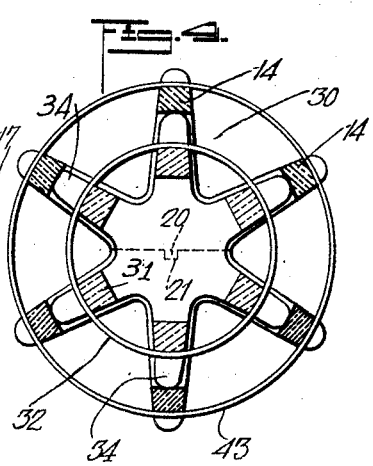
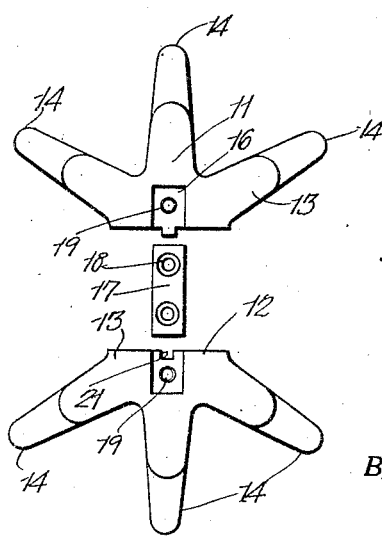
Inventor
GIUSEPPE RIGANTE
By *Clarence A. O'Brien*
Attorney Patented Nov. 22, 1932

1,888,541

UNITED STATES PATENT OFFICE

GIUSEPPE RIGANTE, OF WESTERLEIGH, STATEN ISLAND, NEW YORK

COIL STRUCTURE

Application filed November 5, 1931. Serial No. 573,215.

The present invention relates to new and useful improvements in electrical devices, and more particularly it pertains to a coil of the induction type.

It is one of the objects of the invention to provide a new and improved type of coil of the induction type which will be capable of ready assembly and disassembly.

It is a further object of the invention so to construct a coil of the aforementioned type that the primary or secondary is bodily removable with respect to the other member of the coil.

A still further object of the invention resides in a new and novel construction whereby one of the coils is carried housed within the other coil together with means whereby the innermost coil may be removed or positioned in place.

With the above and other objects in view, reference will be had to the accompanying drawing in which;

Figure 1 is a view in elevation partly in section of a coil constructed in accordance with the present invention, Figure 2 is a view in end elevation thereof, Figure 3 is a longitudinal sectional view thereof, Figure 4 is a transverse sectional view taken on the line 4—4 of Figure 1, and;

Figure 5 is a view in elevation showing the manner in which the two members of the coil support are secured together.

Referring more particularly to the drawing, the reference character 10 designates a suitable coil supporting member and in the present illustration of the invention, this member 10 is shown as consisting of two skeleton members 11 and 12. In this embodiment of the invention each of the members 11 and 12 is constructed in the form of two end members 13 which are connected by a plurality of longitudinally extending bars 14. In the present instance these members 11 and 12 each comprise three of these longitudinally extending bars 14 but it is to be understood that the number is not dependent upon the invention and that the same may be constructed with two longitudinally extending bars 14 or more than three as desired.

The end members 13 of the members 11 and 12 are recessed as at 16 and these recesses are adapted when the members are placed together to receive end plates or the like 17 having openings 18 therein. The openings 18 are adapted to register with openings 19 in the members 13 and securing means in the form of screws or the like are adapted to be received in the openings 18 and 19 to rigidly secure the members 11 and 12 together to form a coil supporting frame. In order to prevent relative movement of the members, one of the members for example, the member 11 may be provided with a projection 20 which is adapted for reception in a recess 21 in the member 12 and thus prevent lateral displacement of the members relative to each other. The members are so arranged as to form an internal housing 30 and this housing is adapted to receive a frame 31 upon which another coil 32 may be wound. This skeleton frame 31 is adapted to be wound with an electrical conductor to form the coil 32 and is placed within the outer member as heretofore described. After the inner skeleton frame 31 has been placed within the outer member, the plates 17 are secured by their fastenings and the inner member will be held within the outer member as best illustrated in Figure 3.

The inner skeleton frame 31 is provided with lugs or the like 34 which are of a diameter equal to the internal diameter of the housing 30 and thus the inner coil frame is prevented from shifting longitudinally of the outer coil frame and proper adjustment of the two coil frames is assured.

Each of the members 11 and 12 which form the outer coil frame, is provided with an extension 40 and these extensions when the members are placed together form a circular support for a coil or the like 41 which is wound thereabout.

It is to be understood that the outer frame member is wound with a conductor 43 and that in order to disassemble the parts this outer coil 43 must be removed as must also the coil 41.

In building a coil in accordance with the present invention, the inner coil frame is wound with its coil winding 32. After this has been done it is placed between or within the two members 11 and 12 after which the plates 17 are secured in position. The screws heretofore mentioned may be of such length that they will engage the adjacent end of the skeleton frame 31 to prevent lateral movement thereof within the outer skeleton frame member. The winding 43 is then formed about the outer frame member, and when desired the winding 41 is likewise formed thereabout.

In a coil of this type, the coil 32 carried by the inner coil frame may be either the primary or secondary of an induction coil, or both the coils 32 and 43 may be secondary then the coil 41 may be a primary or vice versa as desired.

Thus it will be apparent that the present invention provides a new and novel form of coil and method of forming the same, and one in which the assembly is of a simple nature and the coil of a highly efficient nature.

Having thus described the invention, what is claimed as new and what it is desired to secure by Letters-Patent of the United States, is;

1. A device of the character described, comprising an outer skeleton frame and an inner skeleton frame, the outer skeleton frame being formed of two members each of which consists of two end sections, parallel extending spaced bars connecting said end members, means for securing said members together to form the said outer skeleton frame, and the inner skeleton frame being formed in one piece.

2. A device of the character described comprising an outer skeleton frame and an inner skeleton frame, the outer skeleton frame being formed of two members, each of which consists of two end sections, parallel extending spaced bars connecting said end members, interlocking means carried by said members to prevent their relative movement in one direction, means for securing said members together to form the said outer skeleton frame and the inner skeleton frame being formed in one piece.

3. A compound coil structure comprising a skeleton frame of one piece construction and around which a coil is adapted to be formed, and a second skeleton frame adapted to enclose said first mentioned skeleton frame, said second mentioned skeleton frame comprising two complementary half sections capable of disassembly to permit of insertion and removal of the first mentioned coil member, and means secured to the ends of the second mentioned skeleton frame and bridging the joint between the complementary half members thereof for securing said members together to form a skeleton frame.

4. A skeleton frame for carrying electrical coils comprising two complementary members, each comprising end pieces connected together by parallel spaced bars, a semi-circular extension projecting from one of the end members of each of the first mentioned members and semi-circular extensions adapted when the two members are positioned together to form a solid circular projection extending from one end of said skeleton frame, and means for securing said complementary members together to provide a coil carrying unit.

5. A skeleton frame for carrying electrical coils comprising two complementary members, each comprising end pieces connected together by parallel spaced bars, a semi-circular extension projecting from one of the end members of each of the first mentioned members and semi-circular extensions adapted when the two members are positioned together to form a solid circular projection extending from one end of said skeleton frame, and means for securing said complementary members together to provide a coil carrying unit, said last mentioned means comprising plates seated in recesses in the ends of said complementary members and bridging the joint therebetween, and screws passing through said plates and having threaded engagement with said members.

In testimony whereof I affix my signature.

GIUSEPPE RIGANTE.